(12) United States Patent
Bar-David et al.

(10) Patent No.: US 7,813,339 B2
(45) Date of Patent: Oct. 12, 2010

(54) DIRECT ASSEMBLY OF A DATA PAYLOAD IN AN APPLICATION MEMORY

(75) Inventors: Haim Bar-David, Hertzliya (IL); Guy Kastoriano, Rinatia (IL); Michael Ginzburg, Beer Sheva (IL)

(73) Assignee: Tehuti Networks Ltd., Hertzliya (IL)

( * ) Notice: Subject to any disclaimer, the term of this patent is extended or adjusted under 35 U.S.C. 154(b) by 514 days.

(21) Appl. No.: 11/743,172

(22) Filed: May 2, 2007

(65) Prior Publication Data

US 2008/0273532 A1 Nov. 6, 2008

(51) Int. Cl.
*H04L 12/28* (2006.01)
(52) U.S. Cl. .................................... 370/389
(58) Field of Classification Search ............... 370/474, 370/389, 392, 394; 710/22, 23, 24, 26, 27, 710/52, 53
See application file for complete search history.

(56) References Cited

U.S. PATENT DOCUMENTS

| | | | |
|---|---|---|---|
| 6,438,678 B1 * | 8/2002 | Cashman et al. ............... 712/34 |
| 6,996,070 B2 | 2/2006 | Starr et al. | |
| 7,010,626 B2 | 3/2006 | Kahle | |
| 7,012,918 B2 * | 3/2006 | Williams .................... 370/389 |
| 2003/0140124 A1 * | 7/2003 | Burns ........................ 709/220 |
| 2004/0010545 A1 * | 1/2004 | Pandya ....................... 709/203 |
| 2004/0249998 A1 | 12/2004 | Rajagopalan et al. | |
| 2006/0031524 A1 * | 2/2006 | Freimuth et al. ............ 709/227 |
| 2006/0268867 A1 * | 11/2006 | Hashimoto et al. .......... 370/389 |

* cited by examiner

*Primary Examiner*—Kwang B Yao
*Assistant Examiner*—Anh Ngoc Nguyen
(74) *Attorney, Agent, or Firm*—Mark M. Friedman

(57) ABSTRACT

A system and method for direct assembly of data payload in an application memory. A transmission control protocol offloading process is applied by network interface card components on a packet header to provide a direct memory access (DMA) task with precise application memory location pointers to a DMA engine. The DMA engine uses the DMA task to place the data payload directly in the application memory.

12 Claims, 3 Drawing Sheets

DIRECT ASSEMBLY OF A DATA PAYLOAD IN AN APPLICATION MEMORY

FIELD OF THE INVENTION

The present invention relates generally to application memory management in a communications network by a network interface card (NIC) and in particular to reduction of data transfer latency when high level protocol data is transferred between the network and a computer application memory.

BACKGROUND OF THE INVENTION

Computer applications that communicate over a network require a considerable amount of central processing unit (CPU) processing power to decipher the packet-based complex Transmission Control Protocol (TCP)/Internet Protocol (IP). Each network packet must be processed through a protocol stack (multiple protocols) on transmit and receive ends of a network connection.

During the protocol stack process, multiple protocol headers (e.g., TCP, IP, Ethernet) are added in a specific order to the data payload at the transmit end of the connection. These headers are necessary for the data transmission across the network. When a packet is received at the receiver end of the connection, the packet is processed again through the protocol stack and the protocol headers are removed in an opposite order, until the data is recovered and available to a user.

Packet size is determined by the network maximum transfer unit (MTU). When data transmitted between two applications is longer than the MTU, the data is divided into multiple separated packets. More CPU resources are needed as the number of packets increases. When the speed of the network increases, the demands on the CPU escalate as well. Using a direct memory access (DMA) device can help free CPU resources by allowing the system to access the CPU memory without CPU intervention. However, DMA does not reduce the CPU protocol stack processing and usually require additional memory to organize receiving packets before sending them to the application memory. This step adds latency to the data transfer and takes up precious resources.

TCP offload engines (TOE) devices have been developed to free the CPU processing resources by performing some or all of the TCP and IP processing for the computer. The data payloads of the processed packets still need to be aggregated in order using a dedicated memory and transferred to the application memory. That is, the application expects to receive the data in order. Normally a memory is used to hold "out of order" received packets until all the "holes" in the sequential data are filled. Thus, the offloading process does not eliminate the need for data aggregation.

Direct Data Placement (DDP) is a developing protocol described in the "DDP Protocol Specification," published by the Internet Engineering Task Force (IETF) working group on Oct. 21, 2002. DDP may enable an Upper Layer Protocol (ULP) to send data to a Data Sink (i.e. a computer or any other medium capable of receiving data) without requiring the Data Sink to place the data in an intermediate buffer. When data arrives at the Data Sink, a NIC can place the data directly into the ULP's receive buffer. This may enable the Data Sink to consume substantially less memory bandwidth than a buffered model because the Data Sink is not required to move the data from an intermediate buffer to the final destination. This can also enable the network protocol to consume substantially fewer CPU cycles than if the CPU was used to move data, and remove the bandwidth limitation of being only able to move data as fast as the CPU can copy the data.

DDP is much harder to achieve with network applications over TCP/IP (where exemplarily data can arrive out-of-order) because of the nature of the sockets application programming interface (API) used by applications. One protocol that does achieve DDP over TCP/IP is iSCSI, which transports the SCSI storage protocol over TCP/IP. The iSCSI protocol benefits from the fact that storage applications generally do not use the sockets API and are required to provide buffers for all data ahead of that being received from the network. The iSCSI protocol uses tags that indicate exactly where received data should be placed and has mechanisms to limit the expense of dealing with out-of-order TCP/IP data. However, SCSI is a network storage protocol, not a communication protocol.

Various attempts to solve some of the problems above are known in the art. For example, US Patent Application No. 20040249998 by Rajagopalan et al. deals with uploading TCP frame data to user buffers and buffers in system memory. The payload data is uploaded to user buffers in system memory and partially processed frame data is uploaded to legacy buffers allocated in operating system memory space. U.S. Pat. No. 7,012,918 to Williams deals with DDP, disclosing a system comprising a host and a NIC or host bus adapter. The host is configured to perform transport protocol processing. The NIC is configured to directly place data from a network into a buffer memory in the host. U.S. Pat. No. 7,010,626 to Kahle deals with data pre-fetch, disclosing a method and an apparatus for pre-fetching data from a system memory to a cache for a DMA mechanism in a computer system. U.S. Pat. No. 6,996,070 to Starr et al deals with a TCP/IP offload device with reduced sequential processing and discloses a TOE device that includes a state machine that performs TCP/IP protocol processing operations in parallel. If some of these solutions write the data directly to the memory, they either need to process the TCP stack or use additional memory for data payload aggregation.

There is therefore a widely recognized need for, and it would be highly advantageous to have new, efficient ways to approach an application memory. In particular, there is a need to find inexpensive solutions or methods of transferring data to and from the application memory with less CPU processing power or less dedicated processing time for protocol processing and with minimum latency.

SUMMARY OF THE INVENTION

The present invention discloses a method and system for performing assembly of TCP data payload directly on a TCP application memory. The application runs on a host. The method removes the need for reassembling an out-of-order packet before writing the data directly to the application memory and removes the need to use intermediate buffers that require intensive memory copies. The invention also advances the TOE implementation by freeing more CPU resources and by reducing the latency in data delivery from the TCP packet to the application memory.

BRIEF DESCRIPTION OF THE DRAWINGS

For a better understanding of the present invention and to show more clearly how it could be applied, reference will now be made, by way of example only, to the accompanying drawings in which.

DETAILED DESCRIPTION OF THE INVENTION

The essence of the present invention lies in the writing of data payload directly from the network to an application memory, irrespective of the order of received packets. To do so, the invention uses a network interface card (NIC) to perform data aggregation directly in the application memory. A dedicated algorithm implemented by hardware (a pre-processor 202, a microcontroller 204 and a Sub-processor 206, see FIG. 2) and dedicated firmware run on the internal microcontroller, perform the direct placement and aggregation using a DMA engine. Information received after TCP offload processing is combined with pointer management. The method described below is applied to a TCP packet of an already established connection, after application memory pointers for the application memory buffers allocated to this connection are placed in a database in the NIC.

Figure 1:
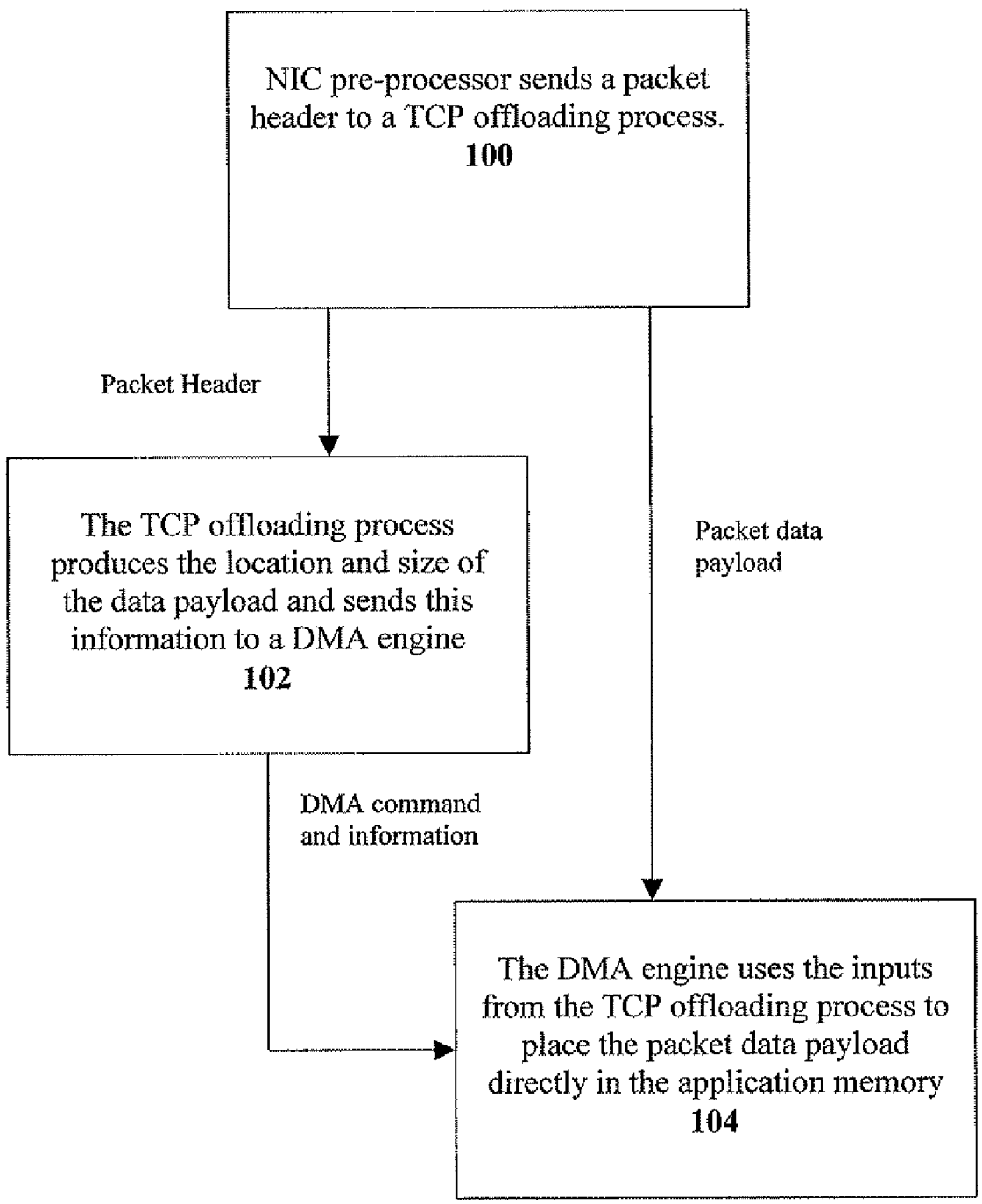
FIG. 1 shows a high level flowchart of the method of the present invention.

FIG. 1 shows a high level flowchart describing the main steps of the method of to the present invention. In step 100, the header of the TCP packet is sent by a NJIC pre-processor (202 in FIG. 2) to a TCP offloading process. In step 102, the TCP offloading process produces information including the location and the size of the data payload and sends this information to the DMA engine. In step 104, the DMA engine uses the received information and performs direct placement of the packet data payload to the application memory.

Figure 2:
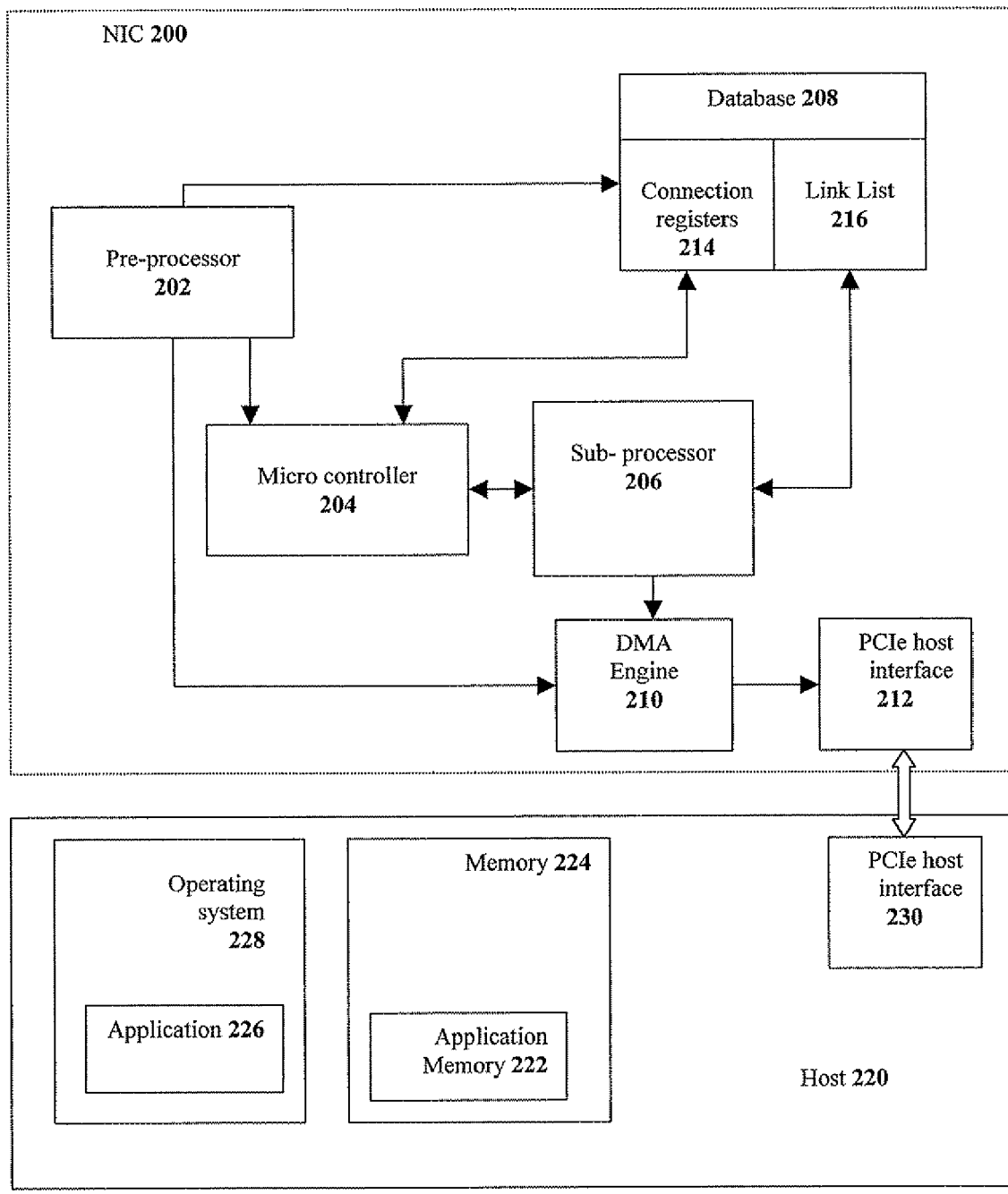
FIG. 2 shows schematically a NIC used to perform the direct assembly of data payload in the application memory.

FIG. 2 shows schematically a NIC 200 coupled to a host 220 and used to perform the direct assembly of data payload in an application memory 222 included in a host memory 224. The application memory is used by an application 226 running on an operating system 228 in host 220. NIC 200 includes a pre-processor 202, a micro-controller 204, a Sub-processor 206, a database 208 having connection registers 214 and a link list 216, a DMA engine 210 and a host interface 212, interconnected as shown. Interface 212 couples the NIC to host 220 and can be any host interface, for example a PCI Express (PCIe) interface. The connection registers hold relevant connection status information (TCP features), e.g. timers and pointers for locations (see "Int-pointer" below).

Pre-processor 202 receives incoming packets from the network and verifies and processes each packet header. This processing fetches TCP ports and IP addresses (destination and source) that allow the pre-processor to generate search tasks to the connection registers to fetch the relevant connection information to be used by micro-controller 204 for the TCP offloading process. The pre-processor also provides micro-controller 204 with execution tasks and with relevant information for the processing of these tasks. Exemplary tasks include updating of database 208 with new application memory pointers and receiving packets.

Micro-controller 204 performs the TCP offload processing (processes the TCP stack). Micro-controller 204 is also responsible for updating connection registers 214. For example, when a connection is established, micro-controller 206 generates a connection register and inserts it into database 210. The generated connection register includes an internal pointer (Int-pointer) to the link list, which stores the buffers allocated by the application in the application memory for the relevant connection. In other words, the connection registers are needed for the offload processing and also for holding the Int-pointer to link list 216. Micro-controller 204 then generates a fetch command to Sub-processor 206

Sub-processor 206 handles the application memory buffers allocated to each connection (allocating them to the relevant TCP data payload). It also provides commands and information (such as "start DMA task", data write address and data length) to the DMA engine. In other words, Sub-processor 206 fetches the memory application pointer from Link List 216, fetches the data payload from pre-processor 202, provides them to the DMA engine and generates a DMA task. The DMA engine places the data payload directly on the application memory using the information provided by Sub-processor 206.

The DMA operation performed by DMA engine 210 can be effected by using descriptors exchanged between the NIC and a device driver (located in the host and not shown). The driver sends the location and the size of the application memory buffers to the NIC using descriptors. The NIC sends the device driver indications about the relevant application memory buffers to be used by the NIC, also using descriptors. When the NIC sends data to the application memory, the NIC micro-controller uses the descriptors to calculate the size and the location of the transactions that will be used to transfer the data.

Figure 3:
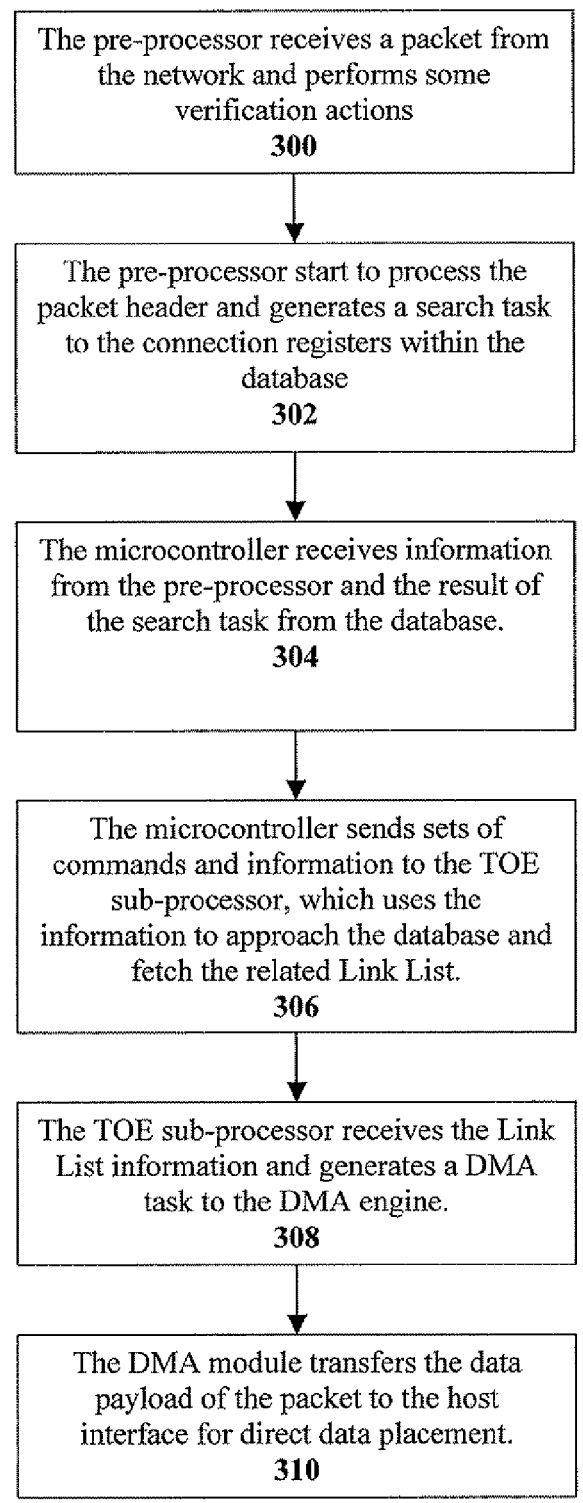
FIG. 3 shows a more detailed flow chart of the method, with more detailed substeps of the major steps in FIG. 1.

FIG. 3 shows a more detailed flow chart of the method, with more detailed sub steps of the major steps in FIG. 1. Pre-processor 202 receives a packet from the network and, after checking the packet header in step 300, generates a search task to connection register 214 to find the relevant connection information in database 208 in step 302. Micro-controller 204 receives the search task results with additional information from pre-processor 202 and processes them in step 304. The microcontroller then sends necessary information (commands and the Int-pointer) to Sub-processor 206. Sub-processor 206 uses the commands and the Int-pointer to approach database 208 and fetch the related link list in step 306. Based on the relevant link list data, Sub-processor 206 issues a DMA task with precise application memory pointers to DMA engine 210 to fetch the data payload from the pre-processor 202, and updates the microcontroller in step 308. DMA engine 210 then transfers the data payload of the packet to host interface 212 for direct data placement in step 310.

The combination of TCP offload processing on Sub-processor 206 and the handling of Link List 216 provide the system with an inventive ability to use DMA engine 210 to place the data directly on the application memory. After the data is written onto the application memory, the application needs to be notified of the written data location. This is done by micro-controller 204, which sends to the device driver a descriptor that points out this "valid data" location to the driver. If a TCP packet is received out-of-order at the NIC, the data payload of the packet will be placed exactly on its dedicated location on the application memory in the order it was received. After the missing packets are received and placed on the application memory so that the packet order is restored, micro-controller 204 sends a respective descriptor to the device driver.

In summary, the present invention advantageously:

a. performs direct data placement to an application memory using a NIC that processes the TCP stack without using additional memory for data aggregation;

b. reduces the latency and resources of moving data from the network to the application memory and c. reduces the CPU processing power.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention

What is claimed is:

1. In a transmission control protocol (TCP) communication network, a method for direct assembly of data payload in an application memory, comprising the steps of: for a packet of an already established connection, the packet having a packet header and data payload:

a) by a TCP offloading process performed on the packet header, fetching an application memory pointer from a link list, wherein the link list stores buffers allocated by an application in the application memory for the established connection; and providing a direct memory access (DMA) task, that includes the application memory pointer to a DMA engine;
  b) by the DMA engine, using the DMA task to write the data payload directly from the network to the application memory without using an intermediate buffer;
  whereby aggregation of data is done directly on the application memory, based on the link list, regardless of the order of received packets.

2. The method of claim 1, wherein the step of providing a DMA task is preceded by the step of: by a pre-processor, receiving the packet from the network, verifying and processing the packet header and dispatching the processed packet header to a microcontroller that performs the TCP offloading process and provides the DMA task.

3. The method of claim 2, wherein the pre-processor processing includes checking the packet header and generating a search task to a connection register in a NIC database that provides TCP ports and IP source and destination addresses.

4. The method of claim 2, wherein the pre-processor, micro-controller and DMA engine are included in a network interface card (NIC).

5. The method of claim 4, wherein the step of providing a DMA task includes producing a data payload location and size and sending the data payload location and size to the DMA engine.

6. The method of claim 5, wherein the producing a data payload location and size is based on use of application memory pointers.

7. The method of claim 5, wherein the producing a data payload location and size includes:
  i. by the NIC microcontroller, processing results of the search task and additional information to generate commands and an internal pointer to a NIC TCP offload engine (TOE), and
  ii. by the TOE sub-processor and based on the commands and internal pointer, fetching a related link list from a NIC database and sending the data payload location and size to the DMA engine.

8. In a transmission control protocol (TCP) communication network that includes a network interface card (NIC), a method for direct assembly of data payload in an application memory, comprising the steps of: for a packet of an already established connection, the packet having a header and data payload:
  a) by a NIC microcontroller, performing a TCP offloading process on the packet header, the performing of the TCP offloading process includes: producing relevant data payload location and size; fetching an application memory pointer from a link list, wherein the link list stores buffers allocated by an application in the application memory for the established connection; and providing the data payload location, the size and the application memory pointer to a NIC direct access memory (DMA) engine; and
  b) by the DMA engine and using the application memory pointer, the data payload location and size, performing placement of the data payload directly from the network into the application memory without use of an intermediate buffer;
  whereby aggregation of data of various packets in the application memory is based on the link list and is performed regardless of the order of received packets.

9. The method of claim 8, wherein the step of performing is preceded by the step of: by a NIC pre-processor, sending the packet header to the microcontroller.

10. The method of claim 9, wherein the step of performing a TCP offloading process includes:
  i. by the NIC pre-processor, receiving the packet from the network, checking the packet header and generating a search task to find relevant connection information in a NIC database
  ii. by the NIC micro-controller, using results of the search task to produce information for a NIC TCP offload engine (TOE) sub-processor,
  iii. by the TOE sub-processor, using the information to fetch a related link list from the NIC database, and
  iv. by the TOE sub-processor, issuing a DMA task to the DMA engine, the DMA task including the relevant data payload location and size.

11. A system for direct assembly of data payload in an application memory, comprising:
  a) a host having an application running thereon, the application having an associated application memory; and
  b) a network interface adapter (NIC) coupled to the host, wherein the NIC includes:
    i. a TCP offload engine (TOE) sub-processor for fetching an application memory pointer from a link list, wherein the link list stores buffers allocated by an application in the application memory for an established connection; and
    ii. a direct memory access (DMA) engine for performing the direct assembly of the data payload on the application memory, based on the application memory pointer;
  wherein the NIC is configured to perform assembly of data payload directly from the network into the application memory without use of intermediate buffers, regardless of the order of received packets of the established connection.

12. The system of claim 11, wherein the NIC configuration to perform direct assembly of data payload is enabled by a NIC pre-processor, a NIC micro-controller, the TCP offload engine (TOE) sub-processor and the direct memory access (DMA) engine, wherein:
  i. the pre-processor is used to verify and process the header of a packet received from the network to provide packet header related search task results and additional information to the NIC microcontroller,
  ii. the microcontroller processes the search task results and additional information to generate commands and an internal pointer to the TOE sub-processor,
  iii. the TOE sub-processor, based on the commands and internal pointer, fetches a related link list from a NIC database and sends the data payload location and size to the DMA engine, and
  iv. the DMA engine performs the direct assembly of the data payload on the application memory, based on the application memory pointer, data payload location and size.

* * * * *

UNITED STATES PATENT AND TRADEMARK OFFICE
CERTIFICATE OF CORRECTION

| | | |
|---|---|---|
| PATENT NO. | : 7,813,339 B2 | Page 1 of 1 |
| APPLICATION NO. | : 11/743172 | |
| DATED | : October 12, 2010 | |
| INVENTOR(S) | : Haim Bar-David | |

It is certified that error appears in the above-identified patent and that said Letters Patent is hereby corrected as shown below:

In the Claims:

Column 5

Claim 8 line 50 should be corrected as follows:
Add:
"to produce"
before:
"producing"

Column 6

Claim 11, line 39 should be corrected as follows:
change
"of
to
"&"

Signed and Sealed this
Eighteenth Day of January, 2011

David J. Kappos
*Director of the United States Patent and Trademark Office*